Feb. 5, 1957 R. E. PAIGE 2,780,017
DISPLAY DEVICE
Filed Feb. 7, 1952 2 Sheets-Sheet 1
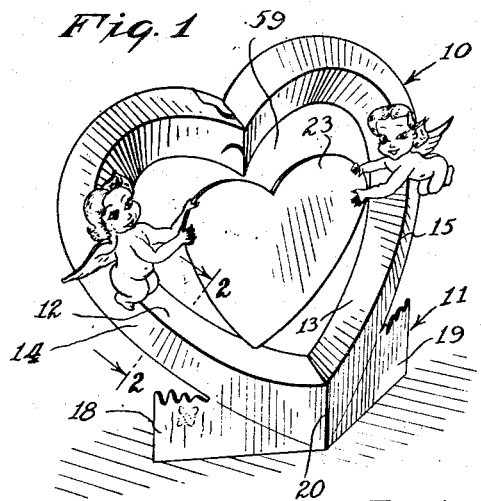
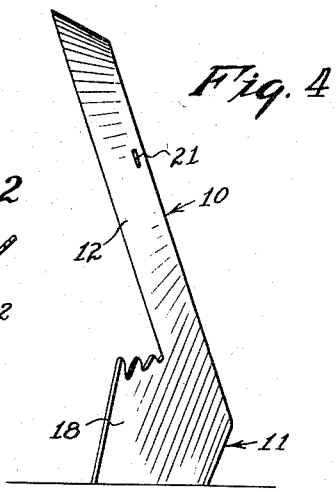
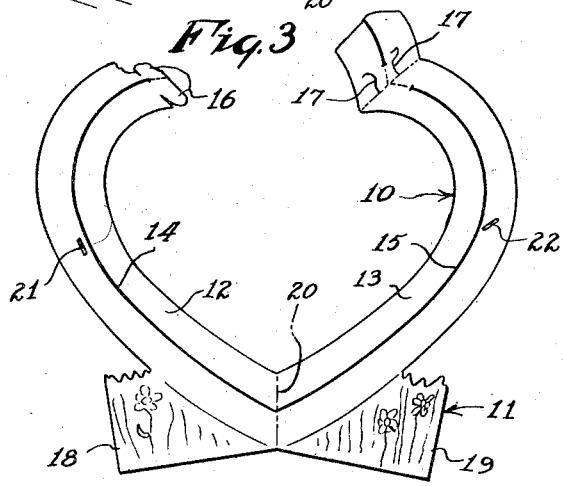
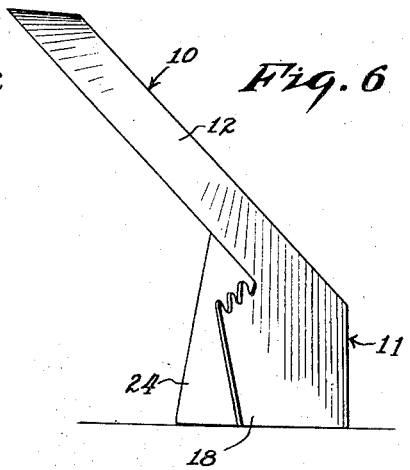
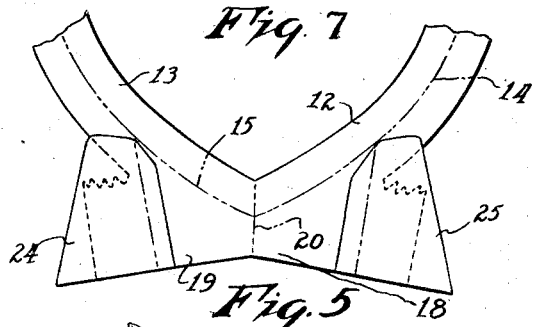
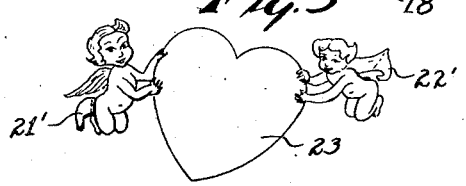
INVENTOR.
RICHARD E. PAIGE
BY
L. S. Saulsbury
ATTORNEY Feb. 5, 1957 R. E. PAIGE 2,780,017
DISPLAY DEVICE
Filed Feb. 7, 1952 2 Sheets-Sheet 2
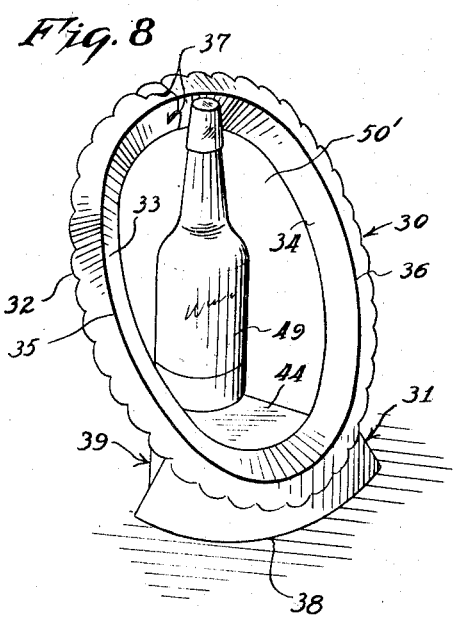
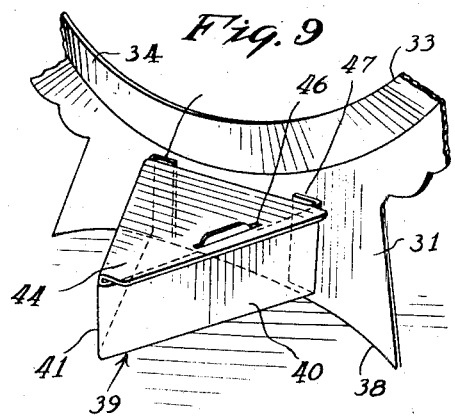
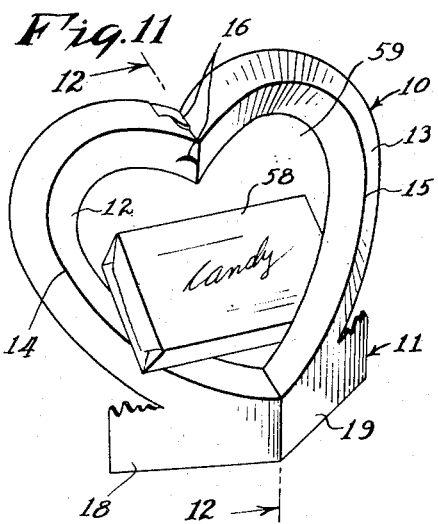
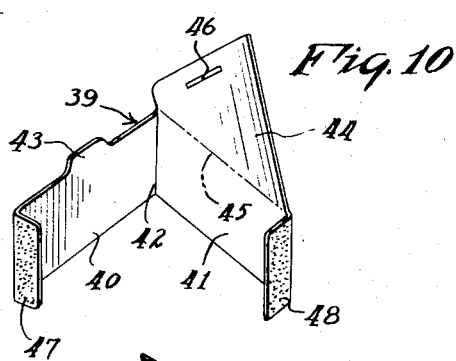
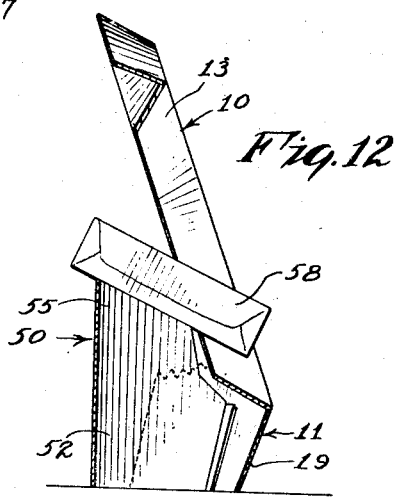
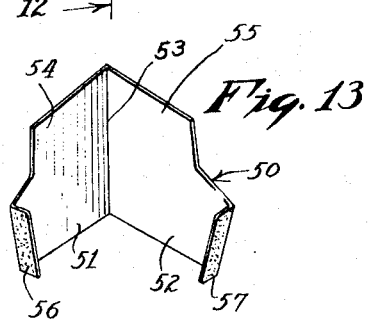
INVENTOR.
RICHARD E. PAIGE
BY
L. S. Saulsbury
ATTORNEY

United States Patent Office 2,780,017
Patented Feb. 5, 1957

2,780,017
DISPLAY DEVICE
Richard E. Paige, New York, N. Y.

Application February 7, 1952, Serial No. 270,383

3 Claims. (Cl. 40—124.1)

This invention relates to display devices.

There is provided a display device of any suitable material, such as cardboard, thin metal or the like and comprising, when erected, a free standing form flexed and secured to itself and resting upon its free bottom edge, the standing form being braced by easels for a short distance on the lower portion thereof but supporting itself by its flexed rigidity in the upper portion thereof. One feature of the invention is the provision of a V-shaped cross-sectional area in the upper portion of the device which lends to the rigidity of the device helping the same to remain rigidly upright. There is also provided novel easel constructions forming parts of the invention and the device possesses several other novel features which will be brought out in the specification.

It is accordingly an object of the invention to provide a novel display device formed of a flat material.

It is another object of the invention to provide a display having a novel circumflexed or V-shaped cross-sectional area in certain portions thereof forming parts of the invention.

It is still another object of the invention to provide a display device having novel supporting easels forming parts of the invention.

Other objects of the invention are to provide a display device having the above objects in mind which is of simple construction, inexpensive to manufacture, has a minimum number of parts, easy to shape and assemble, durable, is of pleasing appearance and convenient to use.

For a better understanding of the invention, reference may be had to the following detailed description taken in connection with the accompanying drawing, in which:

Figure 1 is a perspective view of the display device according to one form of the invention;

Fig. 2 is an enlarged sectional view of the display device taken along line 2—2 of Fig. 1;

Fig. 3 is a front elevational view of the display device illustrating the device as shown in Fig. 1 but showing the same prior to flexing or bending the same;

Fig. 4 is a side elevational view, somewhat enlarged, of the device illustrated in Fig. 1;

Fig. 5 is a front elevational view of a decorative display member forming a part of the device as illustrated in Fig. 1;

Fig. 6 is a side elevational view of another form of the device, the view being similar to Fig. 4, and showing the easels being used therewith;

Fig. 7 is a fragmentary rear elevational view of the device as illustrated in Fig. 6 showing the auxiliary easels thereof in their unextended positions;

Fig. 8 is a perspective view similar to Fig. 1 but showing a modified form which the invention may assume;

Fig. 9 is an enlarged fragmentary perspective view of the device illustrated in Fig. 8 but taken from the rear thereof;

Fig. 10 is a perspective view of an auxiliary easel illustrated in Fig. 9 but showing the same in opened condition prior to its attachment to the display device of Figs. 8 and 9;

Fig. 11 is a perspective view similar to Figs. 1 and 8 but showing a further modification of the invention;

Fig. 12 is a sectional view taken substantially along line 12—12 of Fig. 11; and Fig. 13 is a perspective view of an auxiliary easel utilized in the form of the device shown in Figs. 11 and 12.

Referring now particularly to the drawings, there is shown in Figs. 1 to 4 inclusive, a display device of the character set forth, comprising a body generally designated at 10 and a base or easel portion generally indicated at 11. The body in this case comprises a pair of upwardly and oppositely turned arms 12 and 13, each longitudinally scored in order that it may be flexed as indicated at 14 and 15 respectively. The free end of the arm 12 is provided with tongues 16 while the free end portion of the arm 13 is provided with slots 17 for the reception of the respective tongues 16. The base or easel 11 comprises a pair of outwardly-extending wing formations 18 and 19 which are formed integrally with curved arms 12 and 13, respectively, and the entire device is centrally and vertically scored, as indicated at 20.

Slots 21 and 22 are centrally provided in the arms 12 and 13 respectively each outwardly of the score lines 14 and 15 thereof. A decorative piece 23 is provided with tabs 21' and 22' for insertion into the respective slots 21 and 22, whereby to attach the same across the front of the assembled device, as clearly shown in Fig. 1 of the drawings.

In assembling and using this form of the invention shown in Fig. 1, it will be apparent that the tongues 16 may be inserted into the respective slots 17 by moving the arms 12 and 13 toward each other and at the same time flexing the same to a V-shaped or circumflexed shape as clearly shown in Fig. 2, while at the same time bending the device along the score mark 20 whereupon the base or easel portion 11 will have the wing formations 18 and 19 thereof present a flat bottom edge surface whereupon to support the same as clearly shown in Fig. 4 of the drawings. In such case, the body 10 will extend at an angle upwardly and rearwardly as shown in Fig. 4 and will be supported by the base or easel portion 11.

In Figs. 6 and 7, there is provided a pair of auxiliary easels 24 and 25 which are attached to the rearward faces of the angularly divergent wing formations 18 and 19, and when the device is fully assembled as above described, the bottom edges of the auxiliary easels 24 and 25 and the lower outer corners of the outwardly-extending wing formations 18 and 19 will rest upon the supporting surface whereby to maintain the body 10 at a greater angular relation from the normal of the supporting surface than is the case without the easels 24 and 25.

In Figs. 8 to 10 inclusive, there is shown a supporting device in which there is provided a body 30 and a base or easel portion 31. In this case the body is similar to that heretofore described with regard to Figs. 1 to 7, inclusive, but in this case the body is oval-shaped and has an outer scalloped edge 32. It shall be understood that in any case the edge portions and the general configuration of the device may be varied to suit conditions. In this form also there is provided a pair of outwardly and oppositely scored arms 33 and 34, each of which is centrally scored, as indicated at 35 and 36 respectively, and which arms 33 and 34 are joined at their free end portions by a tab and slot arrangement as heretofore described and as indicated at 37. It will be seen that the base portion 31 when the device is assembled, assumes an arcuate contour, as indicated at 36, and that the lower end thereof rests flatly upon a supporting surface.

An auxiliary easel is generally indicated at 39, Figs. 9 and 10, and is provided with a pair of wall sections 40 and 41 which are interconnected integrally, as indicated at 42, the device being vertically scored at 42 for ease in bending the same to its final shape. Centrally and integrally formed upon the wall 40 is an upwardly extending tab 43 while integrally formed with the upper edge of the wall 41 is a cover 44 whose boundary with the wall 41 is scored, as indicated at 45. One end of the cover 44 has formed adjacent thereto a slot 46. The free ends of the walls 40 and 41 are provided with integrally formed supports 47 and 48 which are glued upon the outer sides thereof, Fig. 10.

The auxiliary easel 39 is mounted upon the rear of the base 31 by adhering the supports 47 and 48 to the rear face thereof and thereafter bending the cover 44 along the scored line 45 so as to allow the slot 46 to receive the tab 43 therein, the cover 44 thereupon forming a platform upon which may be mounted, for example, a bottle 49 or other object to be displayed. Such object 49 will extend upwardly and through an opening 50' provided by the jointed arms 33 and 34 as clearly indicated in Fig. 8 of the drawings.

In the form of the invention illustrated in Figs. 11 to 13 inclusive, there is provided an auxiliary easel generally designated at 50 and which is adapted to be utilized with the body and base of the device illustrated in Figs. 1 to 7 inclusive, and which body and base has applied thereto the identical reference characters of such figures.

The auxiliary easel 50, however, of this form of the invention, comprises a pair of vertical walls 51 and 52 which are integrally interconnected at 53 which boundary between the walls 51 and 52 is vertically scored along the line 53. Each of the walls 51 and 52 is provided with an integrally formed raised portion 54 and 55 respectively and the outer ends of each of the walls 51 and 52 is provided with a vertically-extending integrally-formed supporting arm 56 and 57 on which respectively are arms 56 and 57 with glue, upon their outer surfaces, as clearly shown in Fig. 13. In assembling the auxiliary easel 50 with the display member shown in Figs. 11 and 12, for example, it is only necessary to attach the glue surfaces of the arms 56 and 57 to the rearward faces of the outwardly and extending wing formations 19 and 18 of the base or easel portion 11 whereupon the raised portions 54 and 55 will form together with the inner edges of the arms 12 and 13 a support for a box or package 58, which will thus be presented in such manner that its upper surface inclines forwardly and downwardly through the opening 59 provided between the assembled arms 12 and 13.

While various changes may be made in the detail construction, it shall be understood that such changes shall be within the spirit and scope of the present invention as defined by the appended claims.

What is claimed is:

1. A display device comprising a base, a pair of upwardly extending arms, means for interconnecting the free ends of said arms whereby to form an opening therebetween, said arms being longitudinally-scored whereby when said arms are joined they assume a V-shape in cross-sectional area and are presented at an angle to a supporting surface, said arms and base being vertically-scored whereby when said arms are joined, said base will form a pair of angularly divergent wing formations, and a pair of auxiliary easels each adapted to be attached to the rear face of one of said wing portions whereby to present said arms at a greater angle to the normal line of the supporting surface.

2. A display device comprising a base, a pair of upwardly extending inwardly turned arms, means for interconnecting the free ends of said arms whereby to form an opening therebetween, said arms being longitudinally-scored whereby when said arms are circumflexed and joined they assume a V-shape in cross-sectional area and are rigidly presented at an angle to a supporting surface, and said arms and base being vertically-scored whereby when said arms are joined said base will form a pair of angularly divergent wing portions, and a decorative piece attached to said arms across said opening.

3. A display device formed of a flat blank and comprising a base, a pair of inwardly turned circumflexed arms extending upwardly therefrom, means for connecting the free ends of said arms to form an opening therebetween, said arms being longitudinally scored, rigid and V-shaped in cross section and adapted to extend at an angle inclined to a supporting surface when the device is resting on its base, said arms and base being vertically scored and flexed when said arms are connected together, said arms and base portion being centrally and vertically scored, said base providing a pair of angularly divergent wing supporting portions.

References Cited in the file of this patent

UNITED STATES PATENTS

| | | |
|---|---|---|
| 580,858 | Gibson | Apr. 20, 1897 |
| 1,332,694 | Stranders | Mar. 2, 1920 |
| 2,115,448 | Pradt | Apr. 26, 1938 |
| 2,127,910 | French | Aug. 23, 1938 |
| 2,185,866 | Paige | Jan. 2, 1940 |
| 2,278,076 | Horr | Mar. 31, 1942 |
| 2,503,988 | Arbib | Apr. 11, 1950 |
| 2,616,199 | Robins | Nov. 4, 1952 |
| 2,634,531 | Fielding | Apr. 14, 1953 |

FOREIGN PATENTS

| | | |
|---|---|---|
| 802,625 | France | Sept. 9, 1936 |